April 20, 1954
R. E. THUROW
2,675,935
CLAMP FOR INDUSTRIAL TRUCKS
Filed Nov. 30, 1950
3 Sheets-Sheet 1
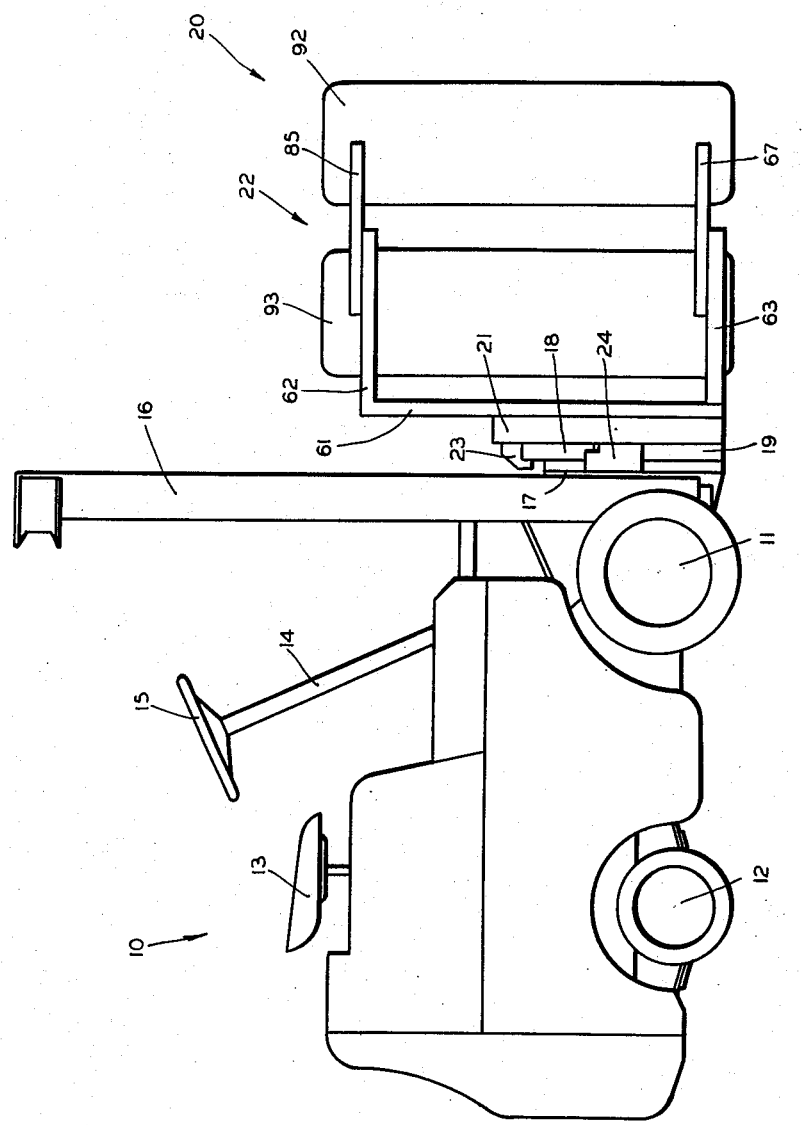
INVENTOR.
ROBERT E. THUROW
ATTYS.

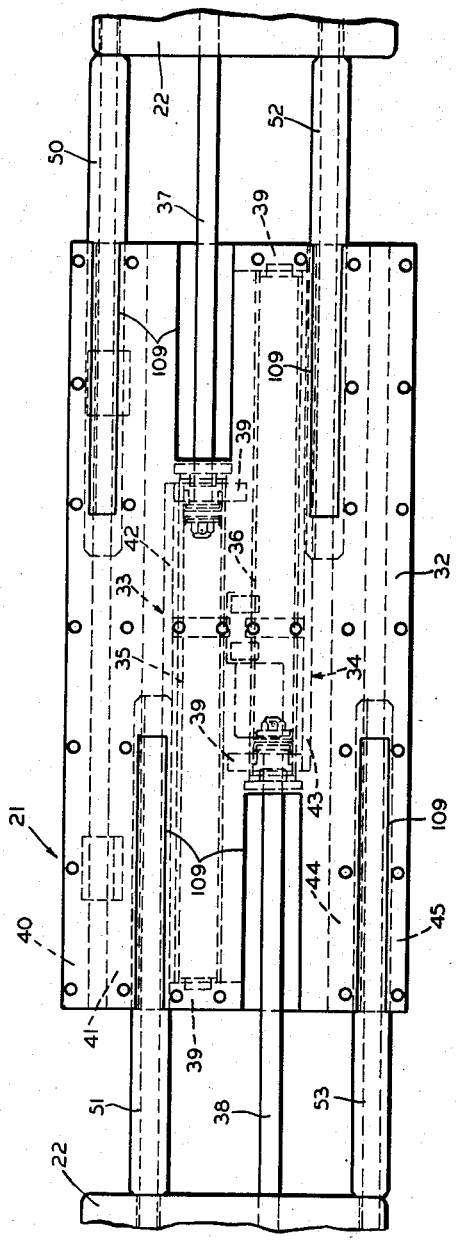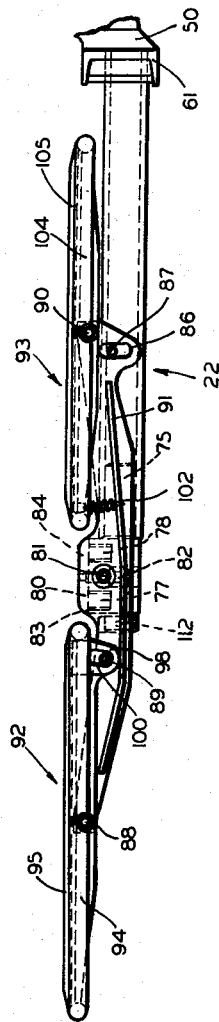

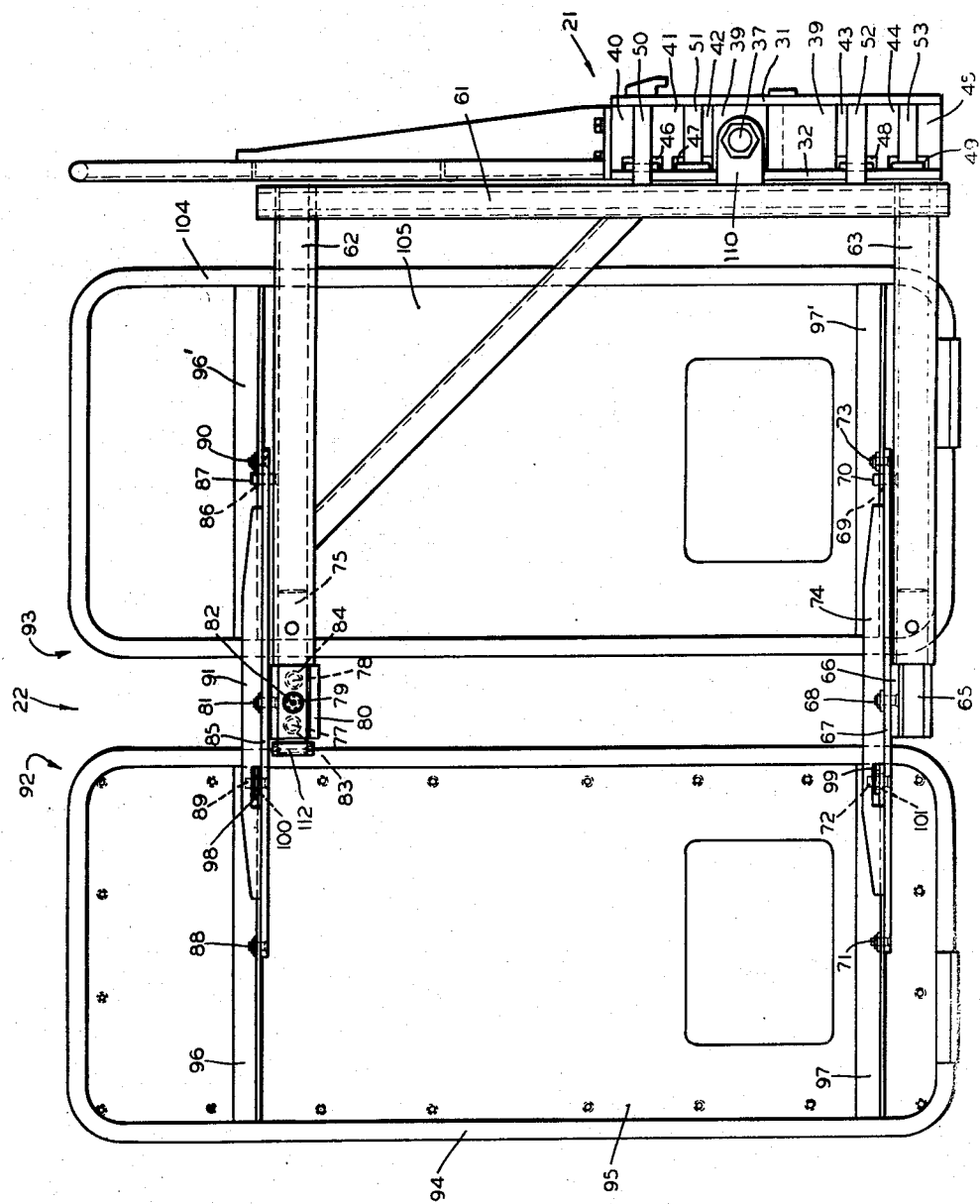

Patented Apr. 20, 1954

2,675,935

UNITED STATES PATENT OFFICE 2,675,935

CLAMP FOR INDUSTRIAL TRUCKS

Robert E. Thurow, Battle Creek, Mich., assignor to Clark Equipment Company, Buchanan, Mich., a corporation of Michigan Application November 30, 1950, Serial No. 198,405

7 Claims. (Cl. 214—653)

1

My invention relates generally to load engaging means, and, more specifically, is directed to clamp means for use with industrial trucks.

It is an object of my present invention to provide an industrial truck with a clamp which is adapted to engage loads of irregular configuration.

It is another object of my present invention to provide an industrial truck with a clamp which is self-equalizing when engaging a load.

It is still another object of my present invention to provide an industrial truck with a clamp having three degrees of pivotal movement.

Now, in order to accomplish the aforementioned objects, I contemplate the provision of load engaging means comprising a pair of vertical forwardly extending clamp arm assemblies which are movable toward and away from each other. Each clamp arm assembly comprises a pair of vertically spaced arm members. A first rocker arm is pivotally mounted intermediate its ends to the lower arm member, about a substantially vertical axis. The first rocker arm is also pivotally mounted to the lower arm member about an axis coinciding with the axis of the latter. A second rocker arm is mounted intermediate its ends on the upper arm member for limited lateral movement relative thereto. The second rocker arm is also pivotally mounted on the upper arm member, about a substantially vertical axis. A pair of clamp pads are pivotally mounted about a substantially vertical axis, one to each pair of adjacent ends of the first and second rocker arms.

From the foregoing description, it will be realized that the clamp pads are adapted to pivot independently about the ends of the rocker arms, and the clamp pads are also adapted to pivot, as a unit, with the rocker arms about the pivotal connections of the latter to the arm members. The clamp pads are further adapted for pivotal movement about horizontal axes coinciding with the axes of the lower arm members. The clamp pads are thus capable of three degrees of pivotal movement, which may take place either separately or simultaneously.

Now, in order to acquaint those skilled in the art with the manner of constructing and using the device of my present invention, I shall describe, in connection with the accompanying drawings, a preferred embodiment of my invention.

In the drawings:

Figure 1 is a side elevational view of an industrial truck with which the load engaging

2 means of my present invention has been incorporated;

Figure 2 is a front elevational view of the load engaging means of Figure 1;

Figure 3 is an enlarged side elevational view of one clamp assembly of the load engaging means of Figure 1; and Figure 4 is a plan view of the clamp assembly of Figure 3.

Referring now to Figure 1, there is shown an industrial truck, indicated generally by the reference numeral 10, which is provided with a pair of driving wheels 11 adjacent the forward end thereof and a pair of steering wheels 12 adjacent the rear end thereof. Mounted on the top of the frame of the truck 10 is a driver's seat 13. A steering column 14 is disposed forwardly of the driver's seat 13, and the steering column 14, adjacent its upper end, is provided with a hand steering wheel 15, operatively connected in a conventional manner to the rear steering wheels 12. A conventional mast 16 is mounted at its lower end to the forward end of the truck 10. Mounted for vertical movement within the mast 16 is a load supporting carriage 17, which carries a pair of vertically spaced transversely extending plate members 18 and 19.

The load engaging mechanism of my present invention is indicated generally by the reference numeral 20, and comprises a clamp arm supporting and actuating mechanism 21 and a pair of clamp arm assemblies 22, one disposed at each end of the clamp arm supporting and actuating mechanism 21. The supporting and actuating mechanism 21 is adapted to be secured to the upper transverse frame member 18 by hook-shaped bracket members 23 and 24, which are disposed in engagement, respectively, with the upper and lower edges of the plate member 18. The supporting mechanism 21, adjacent its lower end, is adapted to bear against the lower transverse frame member 19.

Referring now to Figures 2 and 3, there is shown the clamp arm supporting and actuating mechanism 21 which comprises a pair of vertical transversely extending plate members 31 and 32. Disposed between the plate members 31 and 32 are a pair of horizontal opposed hydraulic piston and cylinder assemblies, indicated generally by the reference numerals 33 and 34, which comprise, respectively, cylinders 35 and 36 and piston rods 37 and 38. Each of the cylinders 35 and 36 has square collars 39 formed adjacent the ends thereof, which collars 39 are suitably secured to the plate members 31 and 32. Both ends of each of the cylinders 35 and 36 are adapted to be connected through hose lines (not shown) to fluid pressure developing means (not shown) carried by the truck 10.

A plurality of horizontal vertically spaced bar members 40, 41, 42, 43, 44, and 45 are disposed between the plate members 31 and 32. The bar members 40, 41, 44, and 45 are secured along their vertical edges to the plate members 31 and 32, while the bar member 42 is secured at its ends to the upper horizontal edges of the collar members 39 of the cylinder 35 and the bar member 43 is secured at its ends to the lower horizontal edges of the collar members 39 of the cylinder 36. As best shown in Figure 3, a plurality of horizontal substantially T-shaped channels 46, 47, 48, and 49 are formed, respectively, intermediate of the bar members 40 and 41, 41 and 42, 43 and 44, and 44 and 45.

T-shaped slide members 50, 51, 52, and 53 are mounted, respectively, for sliding movement within the channels 46, 47, 48, and 49. The T-shaped slide members 51 and 53 and the piston rod 38 are adapted to project outwardly of the plate members 31 and 32 to the left, as viewed in Figure 2. The T-shaped slide members 50 and 52 and the piston rod 37 are adapted to project outwardly of the plate members 31 and 32 to the right, as viewed in Figure 2.

One clamp arm assembly 22 is secured to the outer ends of the T-shaped slide members 51 and 53 and the piston rod 38, and one clamp arm assembly 22 is secured to the outer ends of the T-shaped slide members 50 and 52 and the piston rod 37. In order to permit the clamp arm assemblies 22 to be moved closely together, a plurality of horizontal slots 109 are formed in the forward plate member 32 of the clamp arm supporting and actuating mechanism 21. Since each of the clamp arm assemblies 22 is identical in construction, with the exception that certain parts are reversed, it is believed that a detailed description of one of the assemblies 22 will be sufficient for purposes of the present disclosure.

As shown in Figure 3, a vertically extending fabricated box-like frame member 61 is secured to the forward vertical edges of the T-shaped slide members 50 and 52, adjacent the ends thereof. The frame member 61 is also secured through a flange 110 to the end of piston rod 37. A pair of forwardly extending horizontal tubular arm members 62 and 63 are secured at their one ends, respectively, to the upper and lower ends of the vertical box frame member 61.

The one end of a shaft 65 is disposed in the outer end of the lower tubular arm member 63. The end of the shaft 65, extending outwardly of the tubular arm member 63, has a flat surface formed thereon, to which is suitably secured, as by welding, a bearing plate member 66. A substantially horizontally extending rocker arm member 67 is pivotally mounted, intermediate its ends, on a substantially vertically extending pin member 68 carried by the bearing plate member 66. The rocker arm 67 is provided with a rib 74. The rocker arm 67, adjacent its right end, as viewed in Figure 3, is formed with a slot 69 into which projects the one end of a vertical pin member 70, secured at its other end in the tubular arm member 63. Pivotal movement of the rocker arm 67 about pin 68 is limited to the extent of the movement of the pin 70 within the slot 69. Three horizontally spaced substantially vertically extending pin members 71, 72, and 73 are secured at their one ends in the rocker arm 67 for a purpose to be more fully described hereinafter.

As shown in Figures 3 and 4, the one end of a shaft 75 is fixed in the outer end of the upper tubular arm member 62. A pair of horizontal axially spaced sockets 77 and 78 are formed in the shaft 75, and an opening 79 is formed therethrough and countersunk at one end.

Disposed about the shaft 75 is a C-shaped bracket member 80 which has a generally vertically extending pin member 81 secured in its upper horizontal leg. A bolt 82 is disposed through the opening 79 in the shaft 75, and is threaded into a threaded opening formed in the bight portion of the C-shaped bracket member 80. Spring members 83 and 84 are disposed, respectively, in the sockets 77 and 78, and at their outer ends engage the bight portion of the C-shaped bracket member 80 for normally biasing the latter away from the shaft 75. The head of the bolt 82 is adapted to engage the shoulder formed by the countersinking in the opening 79, thereby limiting movement of the bracket 80 relative to the shaft 75. A collar member 112 is fixed to the end of shaft 75 and limits axial movement of the bracket member 80 relative to the shaft 75.

Pivotally mounted on the pin member 81, carried by the bracket member 80, is a rocker arm 85, identical in shape to the rocker arm 67. The rocker arm 85 is provided with a rib 91. The rocker arm 85, adjacent its right end, as viewed in Figures 3 and 4, is formed with a slot 86, into which slot 86 projects the one end of a vertical pin member 87, suitably secured at its other end in the upper tubular arm member 62. Pivotal movement of the rocker arm 85 about pin 81 is limited to the extent of the movement of the pin 87 within the slot 86. Three horizontally spaced substantially vertically extending pin members 88, 89, and 90 are secured at their one ends in the rocker arm 85.

The tubular arm members 62 and 63 provide support for a pair of clamp pads, indicated generally by the reference numerals 92 and 93. The clamp pads 92 and 93 comprise, respectively, tubular frames 94 and 104, to which are secured panels 95 and 105. The vertical sides of the tubular frames 94 and 104 are, respectively, interconnected adjacent their upper ends by horizontal angle flange members 96 and 96' and adjacent their lower ends by horizontal angle flange members 97 and 97'.

The horizontal legs of the angle flange members 96 and 97 of the clamp pad 92 are pivotally secured, respectively, to pin members 88 and 71 of the rocker arms 85 and 67. Generally horizontally extending arm portions 98 and 99 are secured to the angle flange members 96 and 97, adjacent the right end thereof, as viewed in Figure 3. The arm portions 98 and 99 are formed with slots 100 and 101, into which slots 100 and 101 the aforementioned pin members 89 and 72 project. Pivotal movement of the clamp pad 92 about pins 71 and 88 is limited to the extent of the movement of the pins 72 and 89 within slots 101 and 100.

The angle flange members 96' and 97' of the clamp pads 93, intermediate their ends, are pivotally supported, respectively, on the pin members 90 and 73, carried by the rocker arms 85 and 67. Suitable coil springs 102 are secured at their one ends to the angle flange members 96' and 97' of the clamp pad 93, and the springs 102 at their other ends are secured to the ribs 91 and 74 of the rocker arms 85 and 67. Pivotal movement of the clamp pad 93 about pins 73 and 90 is limited by the springs 102. As described above, the clamp pads 92 and 93 are pivotally mounted to the rocker arms 85 and 67. Since the rocker arm 85 is pivotally mounted to the C-shaped bracket member 80, which, in turn, is mounted on the shaft 75 for limited movement relative thereto, the clamp pads 92 and 93 are adapted for limited pivotal movement about a horizontal axis coinciding with the axis of the lower tubular arm member 63.

From the foregoing description, it will be realized that the load engaging mechanism of my present invention is particularly adapted for engaging loads of irregular shape. The clamp pads 92 and 93 are adapted to pivot independently, respectively, about generally vertically extending axes passing through pin members 71 and 88, and 73 and 90 fixed in the adjacent ends of the rocker arms 85 and 67. The clamp pads 92 and 93 are also adapted to pivot as a unit about a generally vertically extending axis passing through the pin members 68 and 81 which support the rocker arms 67 and 85. The clamp pads 92 and 93 are further adapted for pivotal movement about a horizontal axis, coinciding with the axis of the lower tubular arm member 63. It will, of course, be understood that when the clamp assembly is engaging a load, the three degrees of pivotal movement may take place simultaneously.

When it is desired to engage and transport a load with an industrial truck, to which the load engaging mechanism of my present invention has been secured, the operator of the truck selectively admits fluid under pressure to the closed ends of the cylinders 35 and 36 of the hydraulic piston and cylinder assemblies 33 and 34. The piston rods 37 and 38 are thus extended, causing the T-shaped slide members 51 and 53, together with the adjacent support arm assembly 22, and T-shaped slide members 50 and 52, together with the adjacent support arm assembly 22, to move laterally away from the plate members 31 and 32. The truck 10 is then suitably maneuvered until a clamp arm assembly 22 is disposed on each side of the load to be engaged.

Fluid under pressure is then admitted to the forward ends of the cylinders 35 and 36 of the hydraulic piston and cylinder assemblies 33 and 34, while fluid is simultaneously bled from the closed ends of the cylinders 35 and 36. This causes the piston rods 37 and 38 to be retracted. Retraction of the piston rods 37 and 38 causes the T-shaped slide members 50 and 52, together with the adjacent clamp arm assembly 22, and T-shaped slide members 51 and 53, together with the adjacent clamp arm assembly 22, to be retracted toward the plate members 31 and 32 until the pairs of clamp pads 92 and 93 engage the load. As aforedescribed, the pairs of clamp pads 92 and 93 are self-equalizing and thus will grip a load of irregular shape.

After the load has been gripped between the clamp arm assemblies 22, the load supporting carriage 17 is raised in the mast 16 until the load clears the ground. The truck 10 may then be driven to the desired location where the load is to be deposited. The load supporting carriage 17 is then lowered in the mast 16 until the load engages the ground, after which fluid under pressure is selectively admitted to the closed ends of the cylinders 35 and 36, while fluid is bled from the forward ends of the cylinders 35 and 36. This causes the piston rods 37 and 38 to be extended which, as aforedescribed, effects spreading of the clamp arm assemblies 22, thus releasing the load. The truck 10 may then be backed away and is ready to engage another load.

While I have shown and described what I believe to be a preferred embodiment of my present invention, it will be understood that various modifications and rearrangements may be made therein without departing from the spirit and scope of my present invention.

I claim:

1. For use with an industrial truck having a vertically movable load supporting carriage, load engaging means adapted to be mounted to the load supporting carriage for vertical movement therewith comprising, a pair of substantially vertical forwardly extending clamp arms movable toward and away from each other, a pair of clamp pads one carried by each of said clamp arms, and said clamp pads at their lower ends each being pivotally mounted about a horizontal axis relative to said clamp arms and being mounted at their upper ends for limited lateral movement relative to said clamp arms whereby said clamp pads are laterally movable at their upper ends while simultaneously being pivoted at their lower ends about said horizontal axes.

2. For use with an industrial truck having a vertically movable load supporting carriage, load engaging means adapted to be mounted to the load supporting carriage for vertical movement therewith comprising, a pair of substantially vertical forwardly extending clamp arms movable toward and away from each other, a pair of first rocker arms one pivotally mounted about horizontal and vertical axes to each of said clamp arms adjacent the lower ends thereof, a pair of second rocker arms one mounted for limited lateral movement and pivotal movement about a substantially vertical axis to each of said clamp arms adjacent the upper ends thereof, clamp pads one pivotally mounted about a substantially vertical axis to each pair of adjacent ends of each pair of said first and second rocker arms, and said clamp pads being laterally movable at their upper ends with said second rocker arms while simultaneously being pivoted at their lower ends with said first rocker arms about said horizontal axes.

3. For use with an industrial truck having a vertically movable load supporting carriage, load engaging means adapted to be mounted to the load supporting carriage for vertical movement therewith comprising, a pair of substantially vertical forwardly extending clamp arms movable toward and away from each other, a pair of first rocker arms one pivotally mounted intermediate its ends about horizontal and vertical axes to each of said clamp arms adjacent the lower ends thereof, a pair of second rocker arms one mounted intermediate its ends for limited lateral movement and pivotal movement about a substantially vertical axis to each of said clamp arms adjacent the upper ends thereof, clamp pads one pivotally mounted about a substantially vertical axis to each pair of adjacent ends of each pair of said first and second rocker arms, and said clamp pads being laterally movable at their upper ends with said second rocker arms while simultaneously being pivoted at their lower ends with said first rocker arms about said horizontal axes.

4. For use with an industrial truck having a vertically movable load supporting carriage, load engaging means adapted to be mounted to the load supporting carriage for vertical movement therewith comprising, a pair of vertical forwardly extending clamp arm assemblies movable toward and away from each other, each clamp arm assembly comprising a pair of vertically spaced arm members, a first rocker arm pivotally mounted intermediate its ends to the lower arm member about a substantially vertical axis and an axis coinciding with the axis of said lower arm member, a second rocker arm mounted intermediate its ends to the upper arm member for limited lateral movement and pivotal movement about a substantially vertical axis, and clamp pads one pivotally mounted about a substantially vertical axis to each pair of adjacent ends of said first and second rocker arms.

5. For use with an industrial truck having a vertically movable load supporting carriage, load engaging means adapted to be mounted to the load supporting carriage for vertical movement therewith comprising, a pair of vertical forwardly extending clamp arm assemblies movable toward and away from each other, each clamp arm assembly comprising a pair of vertically spaced arm members, a first rocker arm pivotally mounted intermediate its ends to the lower arm member about a substantially vertical axis and an axis coinciding with the longitudinal axis of said lower arm member, a second rocker arm mounted intermediate its ends to the upper arm member for limited lateral movement and pivotal movement about a substantially vertical axis, clamp pads one pivotally mounted about a substantially vertical axis to each pair of adjacent ends of said first and second rocker arms, and said clamp pads being laterally movable at their upper ends with said second rocker arms while simultaneously being pivoted at their lower ends, with said first rocker arms, about the longitudinal axes of said lower arm members.

6. For use with an industrial truck having a vertically movable load supporting carriage, load engaging means adapted to be mounted to the load supporting carriage for vertical movement therewith comprising, a pair of substantially vertical forward extending clamp arms movable toward and away from each other, a pair of clamp pads one carried by each of said clamp arms, means for pivotally mounting the lower ends of each of said clamp pads to said clamp arms about a horizontal axis, and means for mounting the upper ends of each of said clamp pads to said clamp arms for limited lateral movement relative thereto whereby said clamp pads are laterally movable at their upper ends while simultaneously being pivoted at their lower ends about said horizontal axes.

7. For use with an industrial truck having a vertically movable load supporting carriage, load engaging means adapted to be mounted to the load supporting carriage for vertical movement therewith comprising, a pair of vertical forwardly extending clamp arm assemblies movable toward and away from each other, each clamp arm assembly comprising a pair of vertically spaced arm members, a pair of clamp pads one carried by each of said clamp arms, and said clamp pads at their lower ends each being pivotally mounted about a horizontal axis relative to the lower arm members and being mounted at their upper ends for limited lateral movement relative to the upper arm members whereby said clamp pads are laterally movable at their upper ends while simultaneously being pivoted at their lower ends about said horizontal axes.

References Cited in the file of this patent

UNITED STATES PATENTS

| Number | Name | Date |
| --- | --- | --- |
| 1,807,360 | Wehr | May 26, 1931 |
| 2,226,789 | Tupy | Dec. 31, 1940 |
| 2,475,367 | Avery | July 5, 1949 |
| 2,497,118 | Ferrario et al. | Feb. 14, 1950 |
| 2,536,151 | Backofen et al. | Jan. 2, 1951 |
| 2,554,433 | Warren | May 22, 1951 |
| 2,561,896 | Weiss | July 24, 1951 |
| 2,571,550 | Ehmann | Oct. 16, 1951 |
| 2,604,220 | Frischmann | July 22, 1952 |